US012747909B2

(12) United States Patent

Miller et al.

(10) Patent No.: US 12,747,909 B2
(45) Date of Patent: Sep. 29, 2026

(54) VACUUM INSULATED STRUCTURE WITH ADHESIVE HAVING PLATY ADDITIVE TO LOWER PERMEATION

(71) Applicant: WHIRLPOOL CORPORATION, Benton Harbor, MI (US)

(72) Inventors: Stephen M. Miller, Coloma, MI (US); Devidas B. Raskar, Plymouth, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 172 days.

(21) Appl. No.: 18/451,534

(22) Filed: Aug. 17, 2023

(65) Prior Publication Data

US 2025/0060149 A1 Feb. 20, 2025

(51) Int. Cl.
*F25D 23/06* (2006.01)
*F25D 23/08* (2006.01)

(52) U.S. Cl.
CPC ......... *F25D 23/085* (2013.01); *F25D 23/062* (2013.01); *F25D 23/066* (2013.01); *F25D 2201/14* (2013.01); *Y02B 40/00* (2013.01)

(58) Field of Classification Search
CPC .... F25D 23/085; F25D 23/062; F25D 23/066; F25D 2201/14
See application file for complete search history.

(56) References Cited

U.S. PATENT DOCUMENTS 5,027,574 A 7/1991 Philip
5,989,371 A 11/1999 Nishimoto
8,597,447 B2 12/2013 Utesch et al.
9,752,376 B2 9/2017 Lohwasser
10,788,128 B2 9/2020 Deka et al.
11,085,691 B2 8/2021 Ickes et al.
11,287,177 B2 3/2022 Guizoni et al.
11,340,008 B1 5/2022 Hunter et al.
11,378,328 B2 7/2022 Amorim et al.
2008/0138568 A1 6/2008 Tomita et al.
2019/0128422 A1* 5/2019 Deka ........................ F25D 23/02
2019/0162356 A1* 5/2019 Allard ................... F25D 23/062
2019/0162465 A1 5/2019 Allard et al.
2019/0170174 A1* 6/2019 Deka ........................ F25D 23/06
2020/0132359 A1 4/2020 Amorim et al.
2021/0108852 A1* 4/2021 Guizoni, Jr. .......... F25D 23/085
2023/0080063 A1 3/2023 Krishna et al.

* cited by examiner

*Primary Examiner* — Kimberley S Wright

(74) *Attorney, Agent, or Firm* — PRICE HENEVELD LLP

(57) ABSTRACT

A vacuum insulated appliance includes a cabinet defining at least one compartment. The cabinet includes a wrapper and a liner assembly. The wrapper and the liner assembly define an insulation cavity therebetween. The insulation cavity is under an at least partial vacuum. A trim breaker assembly is coupled to the wrapper and the liner assembly. The trim breaker assembly defines a wrapper groove to receive an edge of the wrapper and at least one liner groove to receive at least one edge of the liner assembly. An adhesive is disposed in the wrapper groove and the at least one liner groove, with the adhesive sealing the insulation cavity. The adhesive includes a platy additive to reduce gas permeation therethrough to maintain the at least partial vacuum in the insulation cavity.

20 Claims, 12 Drawing Sheets

VACUUM INSULATED STRUCTURE WITH ADHESIVE HAVING PLATY ADDITIVE TO LOWER PERMEATION

BACKGROUND OF THE DISCLOSURE

The present disclosure generally relates to an adhesive with a platy additive disposed in a trim breaker assembly for an appliance, and more specifically, to an adhesive with a platy additive disposed in a trim breaker assembly for a vacuum insulated structure to lower gas permeation.

SUMMARY OF THE DISCLOSURE

According to an aspect of the present disclosure, a vacuum insulated appliance includes a cabinet defining at least one compartment. The cabinet includes a wrapper and a liner assembly. The wrapper and the liner assembly define an insulation cavity therebetween. The insulation cavity is under an at least partial vacuum. A trim breaker assembly is coupled to the wrapper and the liner assembly. The trim breaker assembly defines a wrapper groove to receive an edge of the wrapper and at least one liner groove to receive at least one edge of the liner assembly. An adhesive is disposed in the wrapper groove and the at least one liner groove, with the adhesive sealing the insulation cavity. The adhesive includes a platy additive to reduce gas permeation therethrough to maintain the at least partial vacuum in the insulation cavity.

According to another aspect of the present disclosure, a refrigeration appliance includes a trim breaker assembly defining an outside wrapper groove and a refrigerator liner groove. An adhesive is disposed in the outside wrapper groove and the refrigerator liner groove, where the adhesive includes a platy additive to reduce air infiltration through the adhesive. An outside wrapper has an edge disposed within the outside wrapper groove of the trim breaker assembly with the adhesive. A refrigerator liner has an edge disposed within the refrigerator liner groove of the trim breaker assembly with the adhesive. The refrigerator liner defines a refrigerator compartment.

According to yet another aspect of the present disclosure, a method for manufacturing a vacuum insulated cabinet includes providing a trim breaker assembly defining a wrapper groove extending along an outer perimeter and at least one liner groove extending along at least one compartment perimeter, mixing an uncured adhesive with a platy additive, and injecting the uncured adhesive with the platy additive in the wrapper groove and the at least one liner groove. The method further includes positioning an edge of a wrapper within the wrapper groove with the uncured adhesive, positioning an edge of at least one liner within the at least one liner groove with the uncured adhesive, and curing the uncured adhesive in the wrapper groove and the at least one liner groove to form a polymer network that suspends the platy additive to reduce a gas permeation therethrough.

These and other features, advantages, and objects of the present disclosure will be further understood and appreciated by those skilled in the art by reference to the following specification, claims, and appended drawings.

Figure 1:
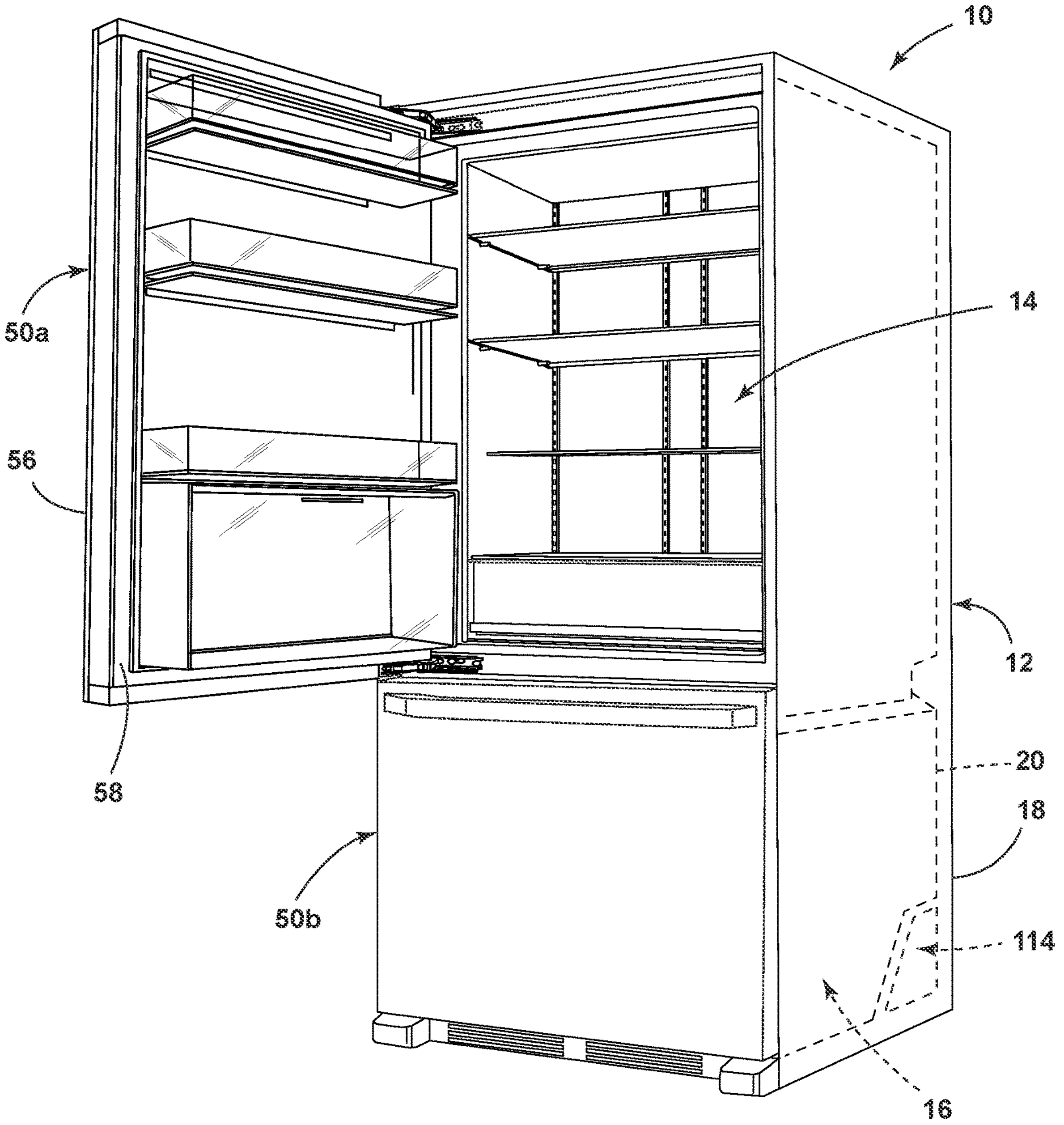
FIG. 1 is a front perspective view of a refrigeration appliance, according to the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to an adhesive with a platy additive disposed in a trim breaker assembly for a vacuum insulated structure to lower gas permeation. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-12, reference numeral 10 generally designates a vacuum insulated appliance. The vacuum insulated appliance 10 includes a cabinet 12 defining at least one compartment, often including a refrigerator compartment 14 and a freezer compartment 16. The cabinet 12 includes a wrapper 18, also referred to as an outside wrapper 18, and a liner assembly 20, including at least one liner 20, which often includes a refrigerator liner 20*a* and a freezer liner 20*b*. The cabinet 12 also includes a trim breaker assembly 22 coupled to the wrapper 18 and the liner assembly 20. The wrapper 18 and the liner assembly 20 define an insulation cavity 24 therebetween. An at least partial vacuum 26 is defined in the insulation cavity 24. The trim breaker assembly 22 defines a wrapper groove 28 to receive an edge 34 of the wrapper 18 and at least one or a plurality of liner grooves 32, which may include liner grooves 32*a*, 32*b*, to receive at least one or a plurality of edges 34, which may include edges 34*a*, 34*b*, of the liner assembly 20. An adhesive 36 is disposed in the wrapper groove 28 and the liner grooves 32. The adhesive 36 seals the insulation cavity 24. The adhesive 36 includes a platy additive 38 to reduce gas permeation therethrough to maintain the at least partial vacuum 26 in the insulation cavity 24.

Figure 2:
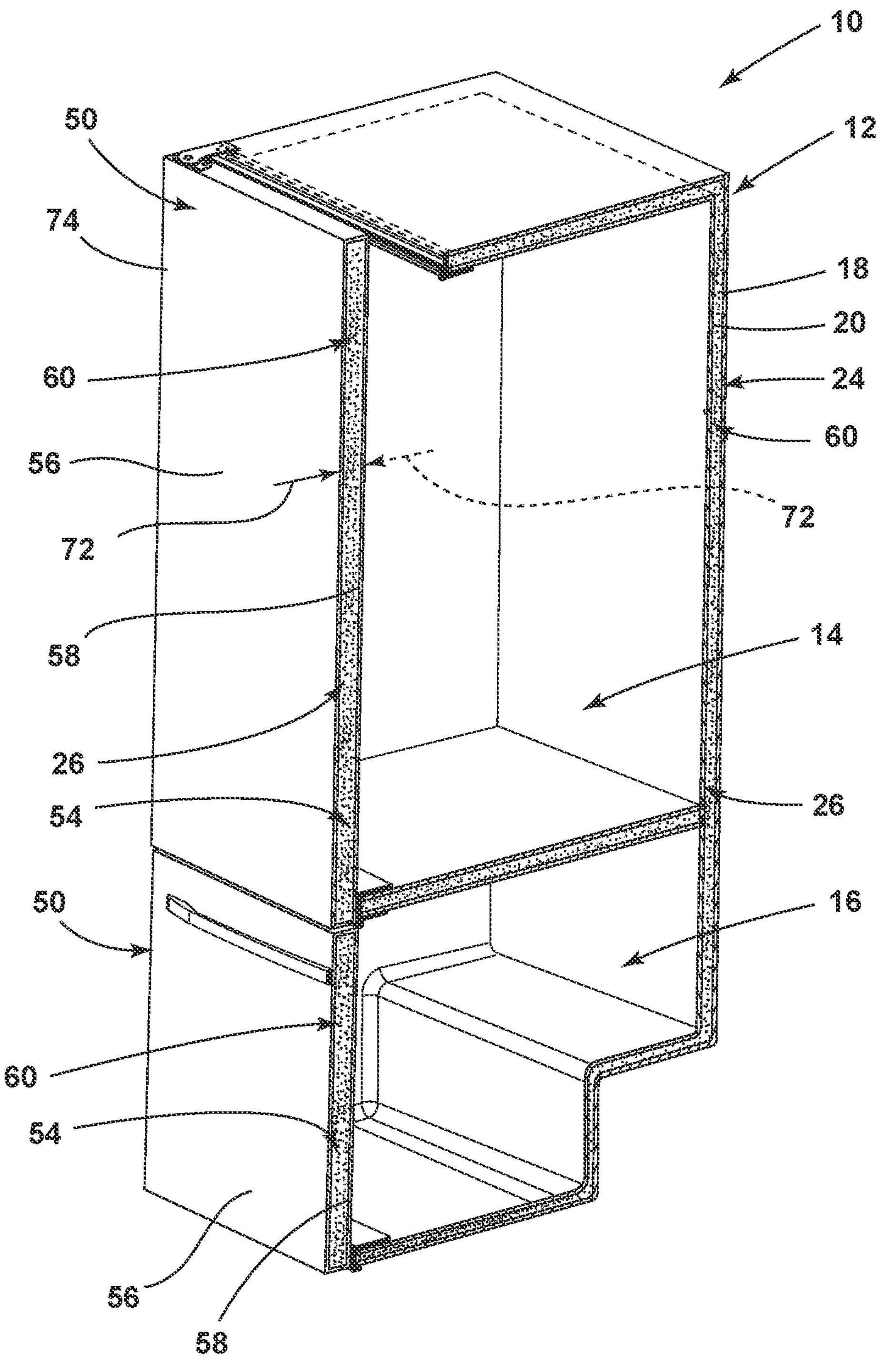
FIG. 2 is a cross-sectional view of a refrigeration appliance with a vacuum insulated cabinet and vacuum insulated doors, according to the present disclosure.

Referring to FIGS. 1 and 2, the vacuum insulated appliance 10 is illustrated as a refrigeration appliance, however, it is contemplated that the vacuum insulated appliance 10 disclosed herein may be for a variety of appliances, structures, panels, or assemblies for insulation purposes other than with an appliance. The refrigeration appliance 10 is illustrated as a bottom-mount refrigerator having an upper compartment configured as the refrigerator compartment 14 and a lower compartment configured as the freezer compartment 16.

The cabinet 12 of the illustrated refrigeration appliance 10 includes a first insulated door 50*a* and a second insulated door 50*b*. The first insulated door 50*a* and the second insulated door 50*b*, which can collectively be referred to as the insulated doors 50, can have substantially similar configurations, as discussed further herein. In this way, the insulated doors 50*a*, 50*b* can seal the refrigerator and freezer compartments 14, 16 defined by the cabinet 12, respectively. Moreover, in various implementations, the appliance 10 includes the cabinet 12 defining at least one compartment, which may include a first compartment, such as the refrigerator compartment 14, and a second compartment, such as the freezer compartment 16, sealed with insulated doors 50. The appliance 10 may be, for example, a bottom-mount French door refrigerator, a top-mount refrigerator, a side-by-side refrigerator, a 4-door French door refrigerator, and/or a 5-door French door refrigerator. Further, the present disclosure is not limited to refrigerators. The appliance 10 may be, for example, freezers, coolers, vacuum insulated structures, and other similar appliances and fixtures within household and commercial settings.

The cabinet 12 of the appliance 10 is an insulated structure having the insulation cavity 24 defined between the wrapper 18 and the liner assembly 20. The wrapper 18 and the liner assembly 20 may collectively be referred to as a structural wrapper that defines the insulation cavity 24. Similarly, the insulated doors 50 are insulated structures each having an insulation cavity 54 defined between a door wrapper 56 coupled to a door liner 58. Each of the insulation cavities 24, 54 of the cabinet 12 and insulated doors 50 typically includes one or more insulation materials 60 disposed therein. It is generally contemplated that the insulation materials 60 may be glass-type materials, carbon-based powders, silicon oxide-based materials, silica-based materials, insulating gasses, and other standard insulation materials 60 known in the art.

The insulation materials 60 substantially fill the insulation cavity 24, forming a substantially continuous layer between the wrapper 18 and the liner assembly 20. Similarly, the insulation materials 60 substantially fill the insulation cavity 54, forming a substantially continuous layer between the door wrapper 56 and the door liner 58, for one or both doors 50. The insulation cavities 24, 54 are filled with the insulation materials 60 using a load port on the cabinet 12 and the insulated doors 50, respectively. The cabinet 12 and the insulated doors 50 each define an evacuation port for applying a vacuum or negative pressure 26 to the insulation cavities 24, 54.

Figure 3:
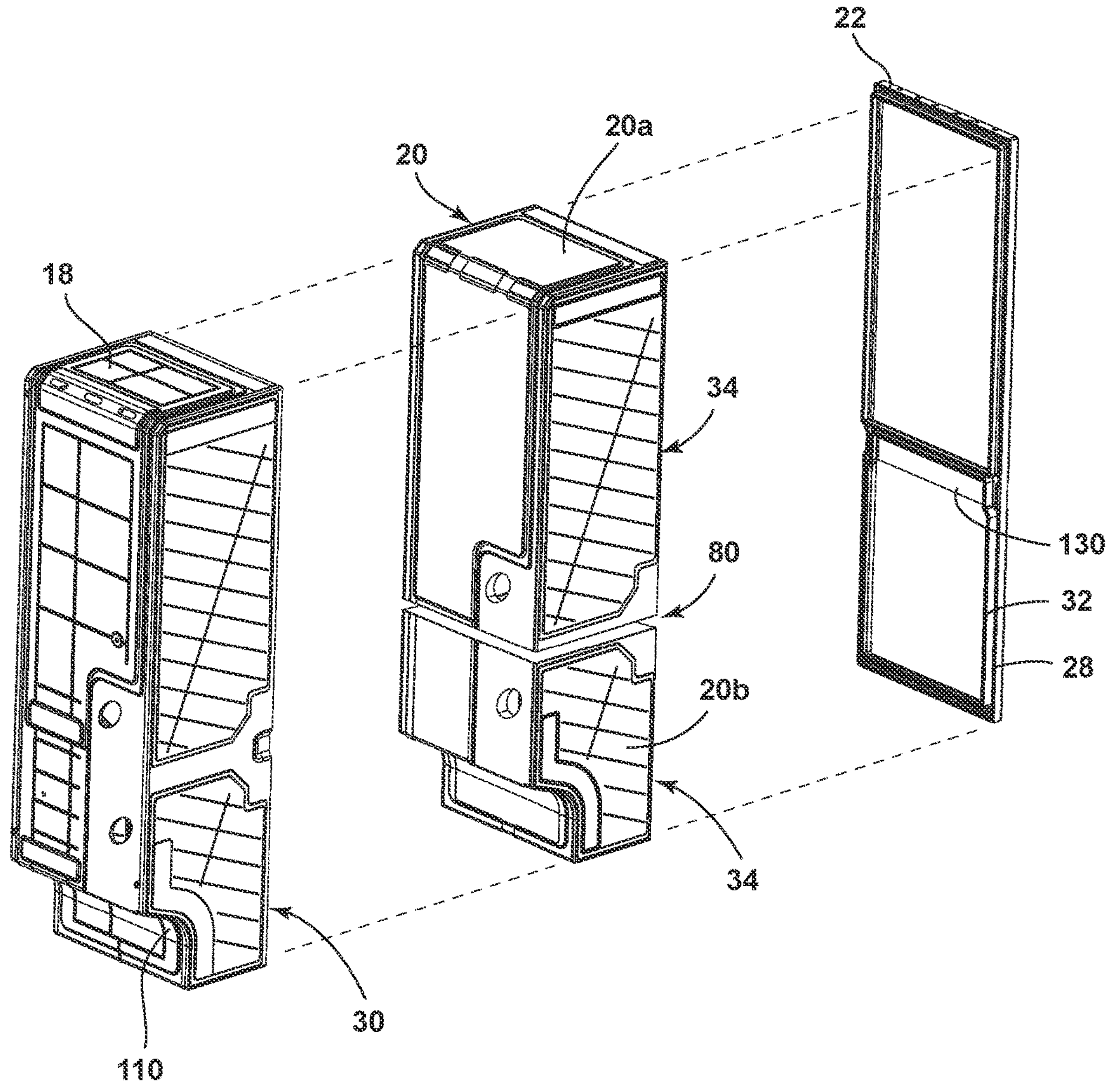
FIG. 3 is an exploded side perspective view of a cabinet for a refrigeration appliance with a wrapper, a liner assembly, and a trim breaker assembly, according to the present disclosure.

Referring still to FIGS. 1-3, the at least partial vacuum 26 is defined within the insulation cavities 24, 54, forming the cabinet 12 and the doors 50 as vacuum insulated structures. The at least partial vacuum 26 defines a pressure differential 72 between an exterior 74 of the cabinet 12 and the insulation cavity 24. The pressure differential 72 serves to define the inward compressive force that is exerted on both the wrapper 18 and the liner assembly 20 and tends to bias the wrapper 18 and the liner assembly 20 toward the insulation cavity 24. The pressure differential 72 and the inward compressive force are also exerted on both the door wrappers 56 and the door liners 58 of the insulated doors 50 and tend to bias the door wrappers 56 and the door liners 58 towards the insulation cavities 54, respectively, in a similar manner.

The wrapper 18, the door wrapper 56, the liner assembly 20, and the door liner 58 are made from a material at least partially resistant to bending, deformation, or otherwise being deformed in response to an inward compressive force. These materials for the wrapper 18, the door wrapper 56, the liner assembly 20, and the door liner 58 include, but are not limited to, metals, polymers, metal alloys, combinations thereof, and/or other similar substantially rigid materials that can be used for vacuum insulated appliances and structures.

Referring to FIG. 3, the liner assembly 20 may include the refrigerator liner 20*a* to define the refrigerator compartment

14 and the freezer liner 20*b* to define the freezer compartment 16. The refrigerator liner 20*a* and the freezer liner 20*b* may also be separate components defining a mullion gap 80 in the insulation cavity 24 therebetween when coupled together. The mullion gap 80 may be filled with the insulation materials 60 and be placed under the at least partial vacuum 26. The refrigerator liner 20*a* and the freezer liner 20*b* may be biased toward the mullion gap 80 in the insulation cavity 24, in a similar manner to that discussed with reference to the wrapper 18 and the liner assembly 20 generally.

In various implementations, the refrigerator liner 20*a* and the freezer liner 20*b* may be coupled together in the mullion gap 80 separate from the trim breaker assembly 22. The refrigerator liner 20*a* and the freezer liner 20*b* may still define the mullion gap 80 when coupled together. While the liner assembly 20 is shown as having two separate liners 20*a*, 20*b*, the liner assembly 20 may be a single portion or structure defining the refrigerator and freezer compartments 14, 16. The liner assembly 20 may also be a single structure defining the refrigerator compartment 14 or the freezer compartment 16. The liner assembly 20 can generally have a similar shape as the wrapper 18 to fit within the wrapper 18 and form the cabinet 12.

Figure 4:
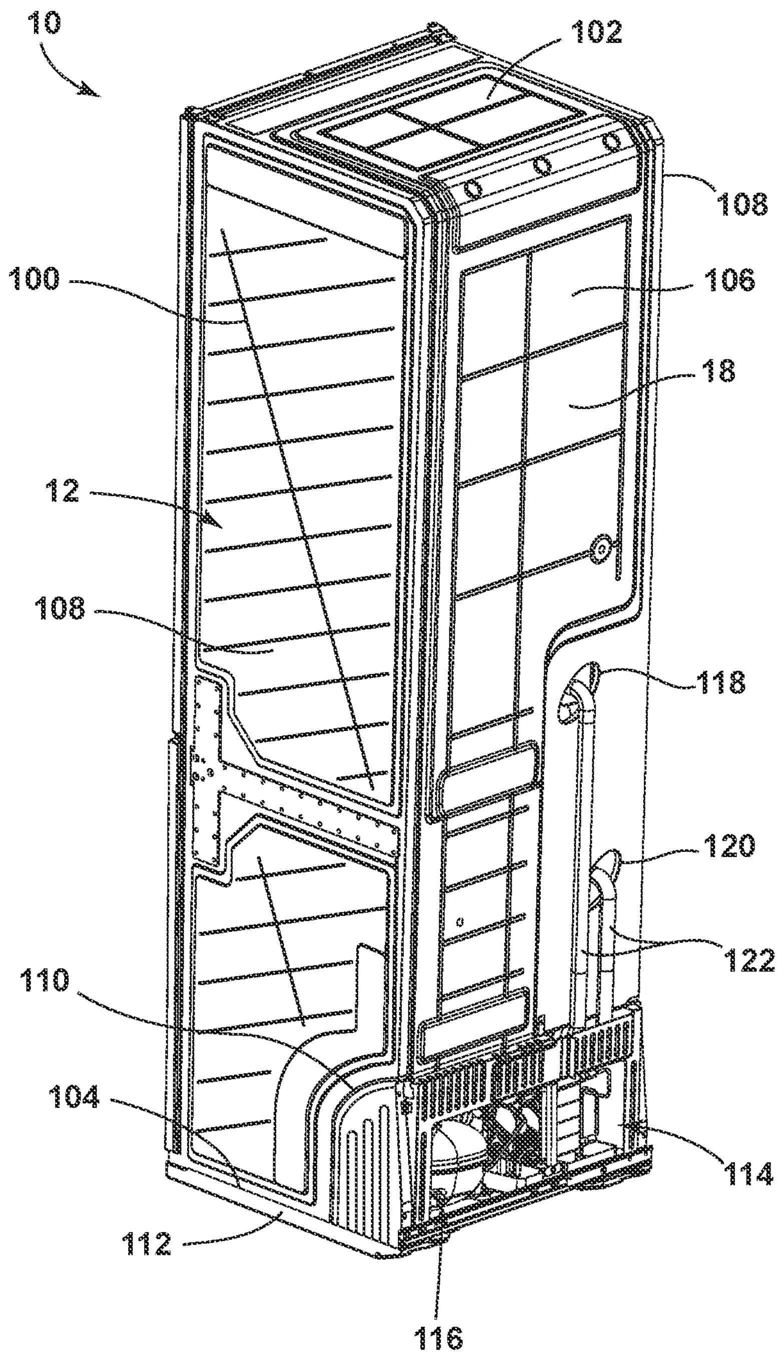
FIG. 4 is a side perspective view of a refrigeration appliance, according to the present disclosure.

Referring still to FIG. 3, as well as FIG. 4, the wrapper 18 has a plurality of walls 100, which may include a top wall 102, a bottom wall 104, a rear wall 106, a pair of side walls 108, and a curved wall 110. The bottom wall 104 of the wrapper 18 may be coupled to a base 112. The curved wall 110 of the wrapper 18 and the base 112 at least partially define a mechanical compartment 114. Various appliance components 116 can be positioned on the base 112 within the mechanical compartment 114 below the rear wall 106 and proximate to the curved wall 110 of the wrapper 18. The appliance components 116 positioned within the mechanical compartment 114 may include components of a refrigerant system, which may include a compressor, a condenser, and/or portions of an evaporator assembly. The appliance components 116 may also include a controller, electronics, or other components for operation of the appliance 10.

The wrapper 18 and the liner assembly 20 may define a first passthrough 118 and a second passthrough 120 to provide a passage for service connections 122. The wrapper 18 and the liner assembly 20 each define apertures that align with one another to form the first and second passthroughs 118, 120. The service connections 122 may be electrical, fluid, refrigerant system, and/or other appliance connections between the refrigerator and freezer compartments 14, 16 and an outside of the cabinet 12. For example, the service connections 122 may include a suction tube, a drain tube, and a wiring harness.

Figure 5:
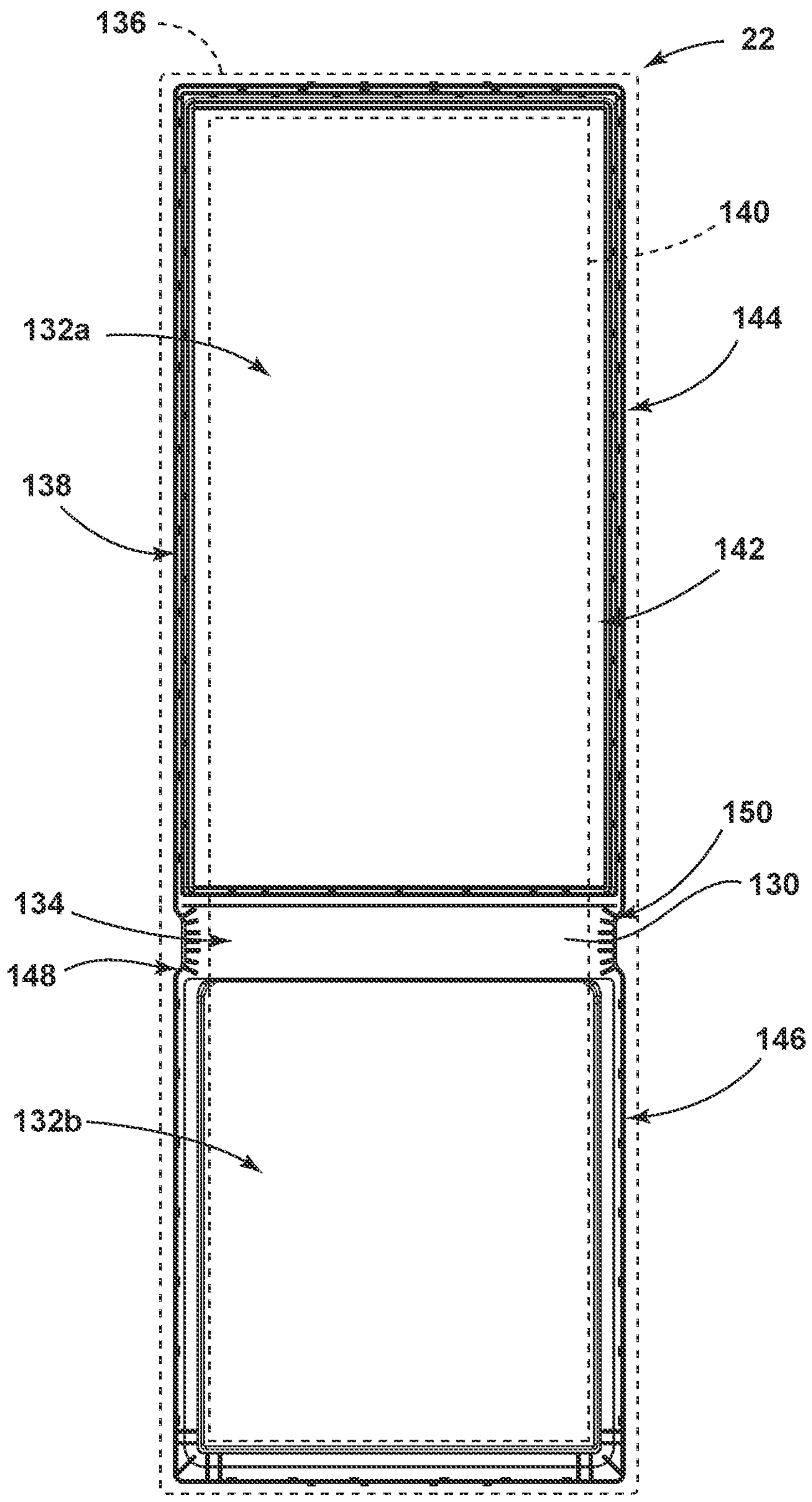
FIG. 5 is a front elevational view of the trim breaker of FIG. 3, according to the present disclosure.
Figure 6:
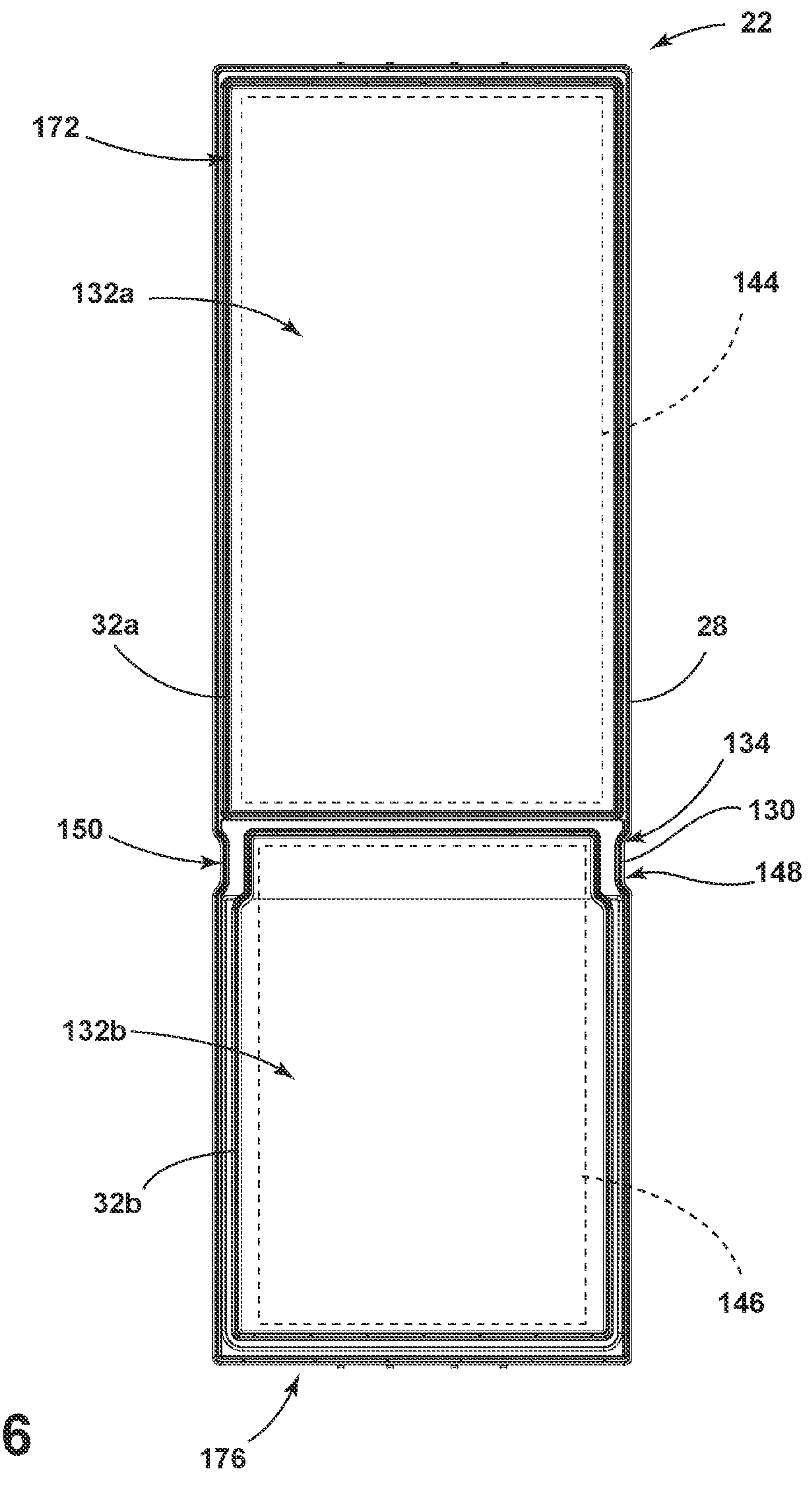
FIG. 6 is a rear elevational view of the trim breaker of FIG. 3, according to the present disclosure.

Referring still to FIG. 3, as well as FIGS. 5 and 6, the trim breaker assembly 22 generally couples the wrapper 18 to the liner assembly 20 to form the cabinet 12. It is contemplated that the trim breaker assembly 22 may be coupled to the edge 30 of the wrapper 18 and/or the edge 34 of the liner assembly 20. The trim breaker assembly 22 has a generally rectangular shape, however, it is contemplated that other geometric shapes known in the art may be used. In this way, the trim breaker assembly 22 may not substantially interfere with access to the refrigerator and freezer compartments 14, 16 defined by the cabinet 12.

The trim breaker assembly 22 may include a cross member 130 to define apertures 132*a*, 132*b* corresponding to the refrigerator and freezer compartments 14, 16 of the appliance 10, respectively. The cross member 130 defines a mullion region 134 between the refrigerator and freezer compartments 14, 16. The trim breaker assembly 22 generally defines an outer perimeter 136 extending along an outer portion 138 of the trim breaker assembly 22 and an inner perimeter 140 extending along an inner portion 142 of the trim breaker assembly 22. The inner perimeter 140 may be concentric and extend parallel with the outer perimeter 138. In the illustrated example, the inner perimeter 140 of the trim breaker assembly 22 includes a portion of a perimeter 144 of the refrigerator compartment 14 around the upper aperture 132*a* and a portion of a perimeter 146 of the freezer compartment 16 around the lower aperture 132*b*. Additional portions of the perimeters 144, 146 of the compartments 14, 16 extend across the cross member 130. These portions of the perimeters 144, 146 may extend parallel to each other across the cross member 130. In this way, the perimeters 144, 146 define openings into the compartments 14, 16, respectively.

The perimeter 144 of the refrigerator compartment 14 may be a portion of the inner perimeter 140, extending around the upper aperture 132*a* from a first end 148 of the mullion region 134 to a second end 150 of the mullion region 134 and along the cross member 130 from the second end 150 of the mullion region 134 to the first end 148. Similarly, the perimeter 146 of the freezer compartment 16 may be a portion of the inner perimeter 140, extending around the lower aperture 132*b* from the first end 148 of the mullion region 134 to the second end 150 and along the cross member 130 from the second end 150 of the mullion region 134 to the first end 148. It is contemplated that the inner perimeter 140 may extend around one aperture 132*a* or 132*b* in implementations where the appliance 10 includes one compartment 14 or 16.

Referring still to FIGS. 3, 5, and 6, the trim breaker assembly 22 defines the wrapper groove 28 and the liner grooves 32 to receive the edge 30 of the wrapper 18 and the edge 34 of the liner assembly 20, respectively. The wrapper groove 28 may extend along the outer perimeter 136 of the trim breaker assembly 22. The trim breaker assembly 22 may include a single liner groove 32 extending along the inner perimeter 140 of the trim breaker assembly 22 or may include multiple liner grooves 32 extending along the perimeters 144, 146 of the compartments 14, 16. It is contemplated that the trim breaker assembly 22 may define a single combined groove that extends along the outer perimeter 136 to accommodate both the wrapper 18 and the liner assembly 20 therein.

In the illustrated example, the refrigerator liner groove 32*a* extends along the perimeter 144 of the refrigerator compartment 14 to receive the refrigerator liner 20*a*, and the freezer liner groove 32*b* extends along the perimeter 146 of the freezer compartment 16 to receive the freezer liner 20*b*. Stated differently, the refrigerator liner groove 32*a* extends along the inner perimeter 140 around the upper aperture 132*a* from the first end 148 of the mullion region 134 to the second end 150 of the mullion region 134, and along the cross member 130 from the second end 150 of the mullion region 134 to the first end 148. The freezer liner groove 32*b* extends along the inner perimeter 140 around the lower aperture 132*b* from the first end 148 of the mullion region 134 to the second end 150, and along the cross member 130 from the second end 150 of the mullion region 134 to the first end 148. In various implementations, the liner groove 32 may be a single groove 32 that accommodates both the refrigerator liner 20*a* and the freezer liner 20*b* of the liner assembly 20.

Referring still to FIGS. 5 and 6, and now also FIGS. 7A-9B, the trim breaker assembly 22 may include multiple cross-sectional profiles at different locations, including a first cross-sectional profile 170 along a portion 172 of the perimeter 144 of the refrigerator compartment 14 and a second cross-sectional profile 174 along a portion 176 of the perimeter 146 of the freezer compartment 16. The cross member 130 may be the first cross-sectional profile 170, the second cross-sectional profile 174, and/or another, third cross-sectional profile. The first cross-sectional profile 170 and the second cross-sectional profile 174 may each define the wrapper groove 28 and the respective liner groove 32.

The wrapper groove 28 in the first cross-sectional profile 170 may align with the wrapper groove 28 in the second cross-sectional profile 174, thereby forming a continuous wrapper groove 28 around the outer perimeter 136 of the trim breaker assembly 22. In some implementations, the liner groove 32*a* defined by the first cross-sectional profile 170 may align with the liner groove 32*b* defined by the second cross-sectional profile 174 to form a continuous liner groove 32 around the inner perimeter 140 of the trim breaker assembly 22. In the illustrated example, the liner groove 32*a* defined by the first cross-sectional profile 170 aligns with the liner groove 32*a* defined by the cross member 130, forming the liner groove 32*a* extending around the perimeter 144 of the refrigerator compartment 14. Similarly, the liner groove 32*b* defined by the second cross-sectional profile 174 aligns with the liner groove 32*b* defined by the cross member 130, forming the liner groove 32*b* extending around the perimeter 146 of the freezer compartment 16.

Figure 7A:
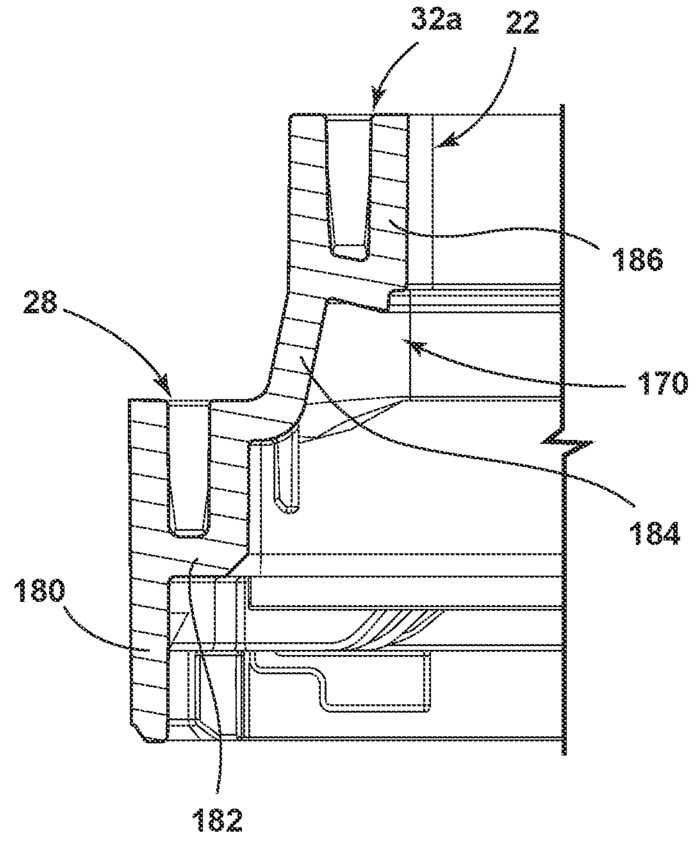
FIG. 7A is a partial cross-sectional view of a trim breaker assembly for a cabinet for a refrigeration appliance, according to the present disclosure.
Figure 8A:
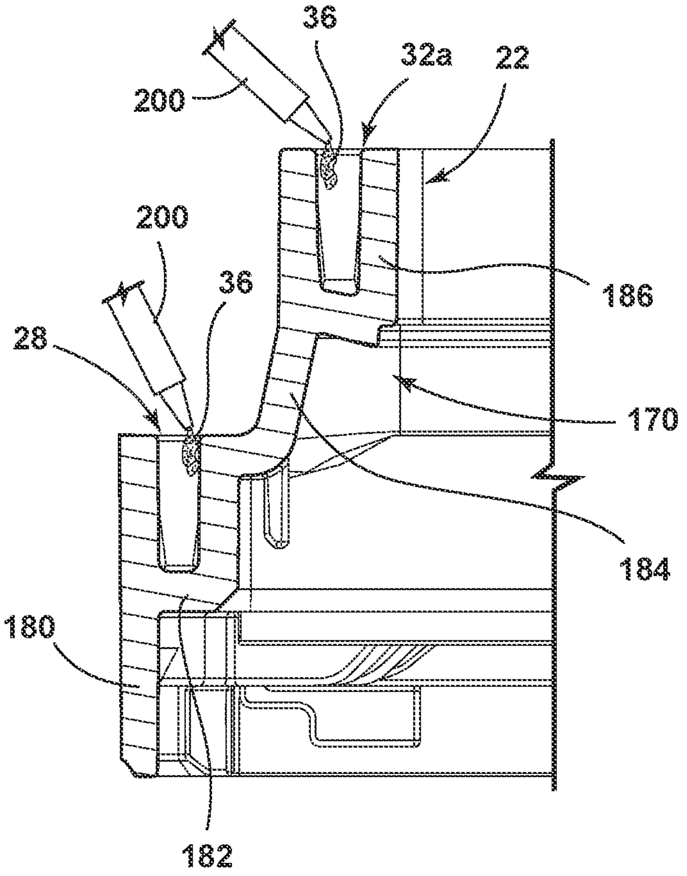
FIG. 8A is a partial cross-sectional view of a trim breaker assembly for a cabinet for a refrigeration appliance, illustrating an adhesive being added to grooves, according to the present disclosure.
Figure 9A:
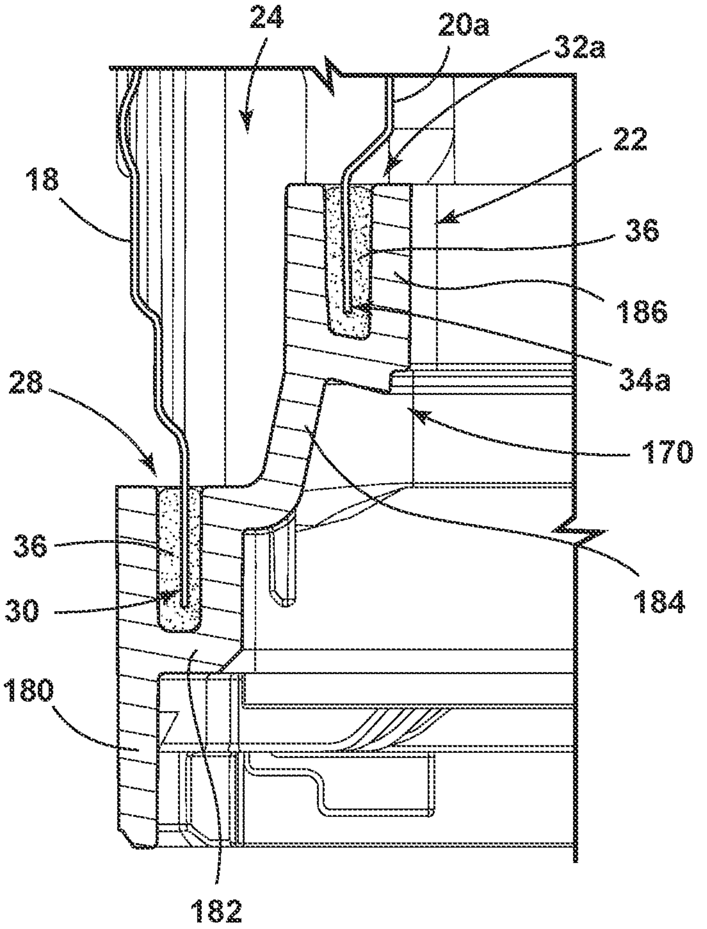
FIG. 9A is a partial cross-sectional view of a cabinet of a refrigeration appliance, illustrating a trim breaker assembly having an adhesive disposed in grooves with the trim breaker assembly coupled to a wrapper and a liner assembly, according to the present disclosure.

Referring to FIGS. 7A, 8A, and 9A, the first cross-sectional profile 170 of the trim breaker assembly 22 includes an outside wall 180 that extends generally parallel to and away from the wrapper 18 when coupled thereto. A wrapper groove wall 182 is coupled or connected to the outside wall 180. The wrapper groove wall 182 extends away from and then parallel to the outside wall 180 to define the wrapper groove 28 therebetween. An inner wall 184 is coupled or connected to the wrapper groove wall 182 and extends to a liner groove wall 186 that defines the liner groove 32*a*. The liner groove 32*a* may be offset or recessed from the wrapper groove 28.

Figure 7B:
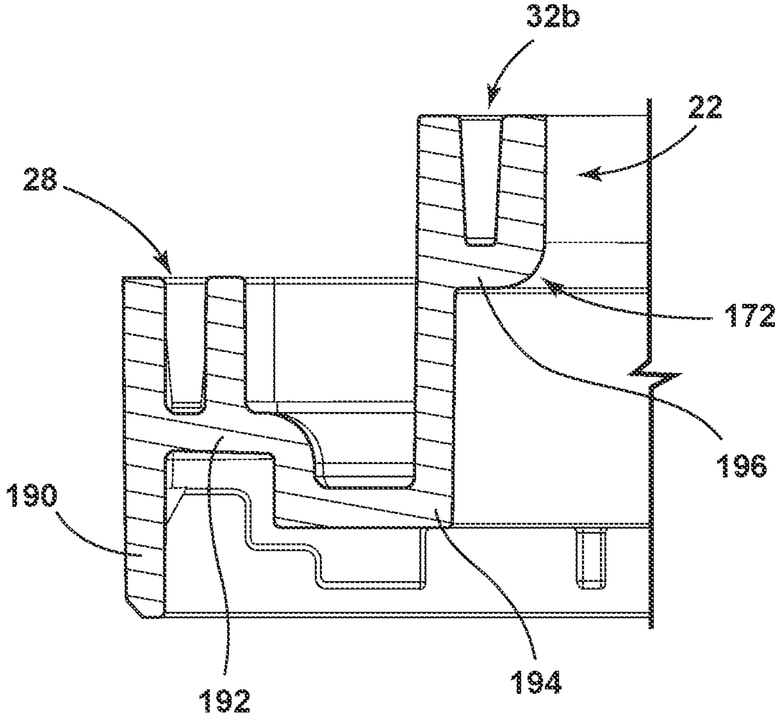
FIG. 7B is a partial cross-sectional view of a trim breaker assembly for a cabinet for a refrigeration appliance, according to the present disclosure.
Figure 8B:
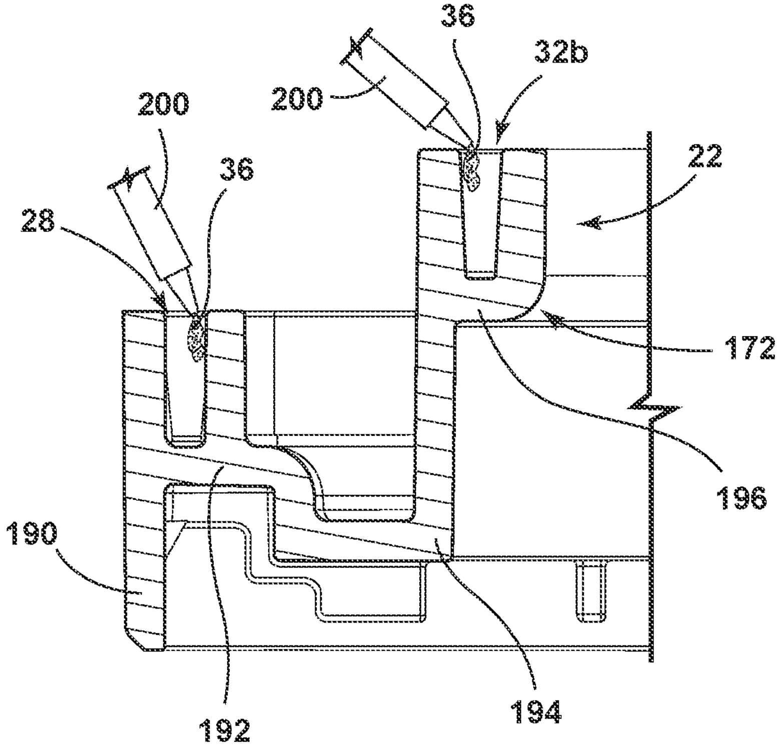
FIG. 8B is a partial cross-sectional view of a trim breaker assembly for a cabinet for a refrigeration appliance, illustrating an adhesive being added to grooves, according to the present disclosure.
Figure 9B:
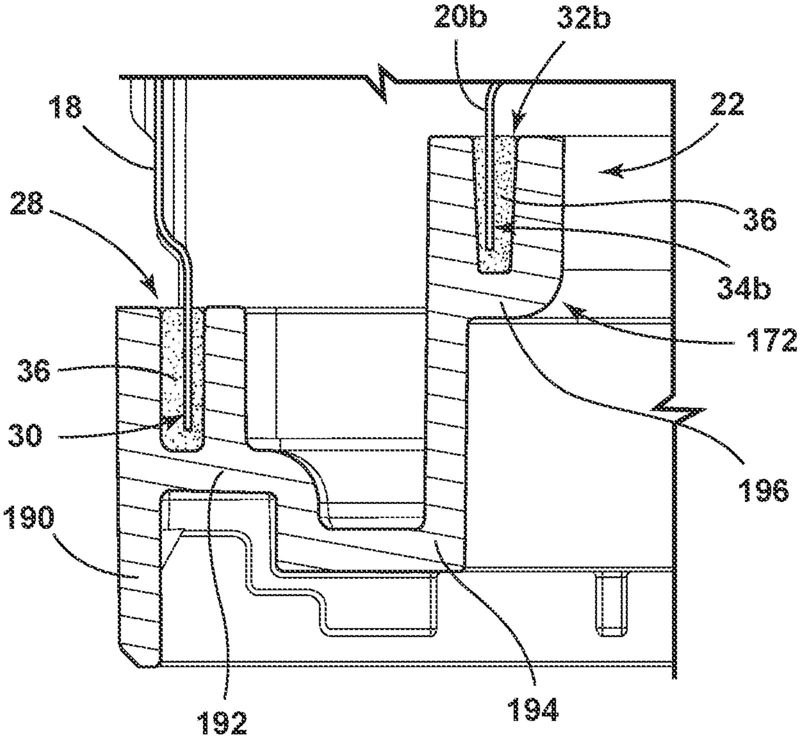
FIG. 9B is a partial cross-sectional view of a cabinet of a refrigeration appliance, illustrating a trim breaker assembly having an adhesive disposed in grooves with the trim breaker assembly coupled to a wrapper and a liner assembly, according to the present disclosure.

Referring to FIGS. 7B, 8B, and 9B, the second cross-sectional profile 174 of the trim breaker assembly 22 includes an outside wall 190 that extends generally parallel to and away from the wrapper 18 when coupled thereto. A wrapper groove wall 192 is coupled or connected to the outside wall 190. The wrapper groove wall 192 extends away from and then parallel to the outside wall 190 to define the wrapper groove 28 therebetween. An inner wall 194 is coupled or connected to the wrapper groove wall 192 and extends to a liner groove wall 196 that defines the liner groove 32*b*. The liner groove 32*b* may be offset or recessed from the wrapper groove 28.

In some implementations, the first cross-sectional profile 170 or the second cross-sectional profile 174 may be the same profile around both of the compartments 14, 16. The first cross-sectional profile 170 and second cross-sectional profile 174 are not limited to the configurations described. The first cross-sectional profile 170 and second cross-sectional profile 174 may also be configured to include the single groove to accommodate both the wrapper 18 and the liner assembly 20.

Referring to FIGS. 8A and 8B, the adhesive 36 may be dispensed or disposed in the wrapper groove 28 and the liner grooves 32 using an adhesive nozzle 200 configured to be adjusted around the perimeters 144, 146 of the compartments 14, 16 and/or the outer perimeter 136 of the trim breaker assembly 22. The adhesive nozzle 200 may be coupled to a linear robot or other machines that are configured to move the adhesive nozzle 200 along a defined path. The adhesive nozzle 200 may be moved or routed along the defined path to dispense and at least partially fill the grooves 28, 32 with the adhesive 36. The adhesive nozzle 200 is not limited to adjustment by machines or robots and may be adjusted manually by a user or operator. For example, the adhesive nozzle 200 may be coupled to a handheld dispenser adjusted by the user.

The adhesive 36 is generally dispensed in an uncured state and undergoes a curing process resulting in a cured state. In the uncured state, the adhesive 36 may be a liquid, a fluid, or a semi-solid where the adhesive 36 may be directed to specific locations in the grooves 28, 32 through the adhesive nozzle 200. In the uncured state, the adhesive 36 has not undergone the curing process or has partially undergone the curing process. The adhesive 36 may be dispensed by the adhesive nozzle 200 before undergoing or starting the curing process. In some implementations, the adhesive 36 may begin to undergo the curing process in the adhesive nozzle 200 or while being dispensed therefrom.

The adhesive 36 may undergo the curing process once introduced to an atmosphere or being subject to an activated curing process, such as using light (e.g., ultraviolet light) or heat, or introducing a catalyst. In some implementations, the adhesive 36 may also be a multi-part mix where the curing process begins when components are mixed together, causing a chemical reaction to begin. For example, the adhesive 36 may be a two-part epoxy having a first component and a second component that begin the curing process when mixed together. In various implementations, the adhesive 36 may include a photoinitiator that reacts with light to catalyze or initiate the chemical reaction. The adhesive 36 may also be heat reactive where the curing process is initiated or catalyzed by being baked or heated to initiate and/or complete the curing process.

During the curing process, the adhesive 36 may adhere to the trim breaker assembly 22, the wrapper 18, and/or the liner assembly 20. The adhesive 36 may chemically react with the trim breaker assembly 22, the wrapper 18, and/or the liner assembly 20, creating a chemical bond, and/or the adhesive 36 may mechanically couple to the trim breaker assembly 22, the wrapper 18, and/or the liner assembly 20. The adhesive 36 generally cures to a solid or semi-solid state to couple the wrapper 18 and/or liner assembly 20 to the trim breaker assembly 22. The adhesive 36 in the cured state may be an air barrier between the insulation cavity 52 and the outside of the cabinet 12. The adhesive 36 in the cured state may be air impermeable or substantially air impermeable to allow for the insulation cavity 52 to maintain the at least partial vacuum 26 therein. The adhesive 36 may also cure to resist or substantially resist the pressure differential 72 between the insulation cavity 52 and the outside of the cabinet 12.

The adhesive 36 may be a structural adhesive to couple the trim breaker assembly 22 to the wrapper 18 and/or the liner assembly 20. Structural adhesives generally cure to form bonds that can bear a structural load. The adhesive 36 generally includes a monomer, and may also include an oligomer, the photoinitiator, and additional additives (e.g., stabilizers, pigments, inhibitors, etc.) in the uncured state. In non-limiting examples, the adhesive 36 may be an epoxy adhesive. The epoxy adhesive may be a one-part epoxy or a two-part epoxy. In such examples, the monomer includes a free epoxide group that reacts with a free radical to form a polymeric chain during the curing process. The two-part epoxy may begin the curing process upon the two parts being mixed. However, the adhesives 36 is not limited to such example may be acrylic adhesives, urethane acrylate ester adhesives, urethane adhesives, silicone adhesives, other adhesives, or combinations thereof that cure to adhere the trim breaker assembly 22 to the wrapper 18 and/or the liner assembly 20 and prevent or reduce air infiltration therethrough.

Figure 10:
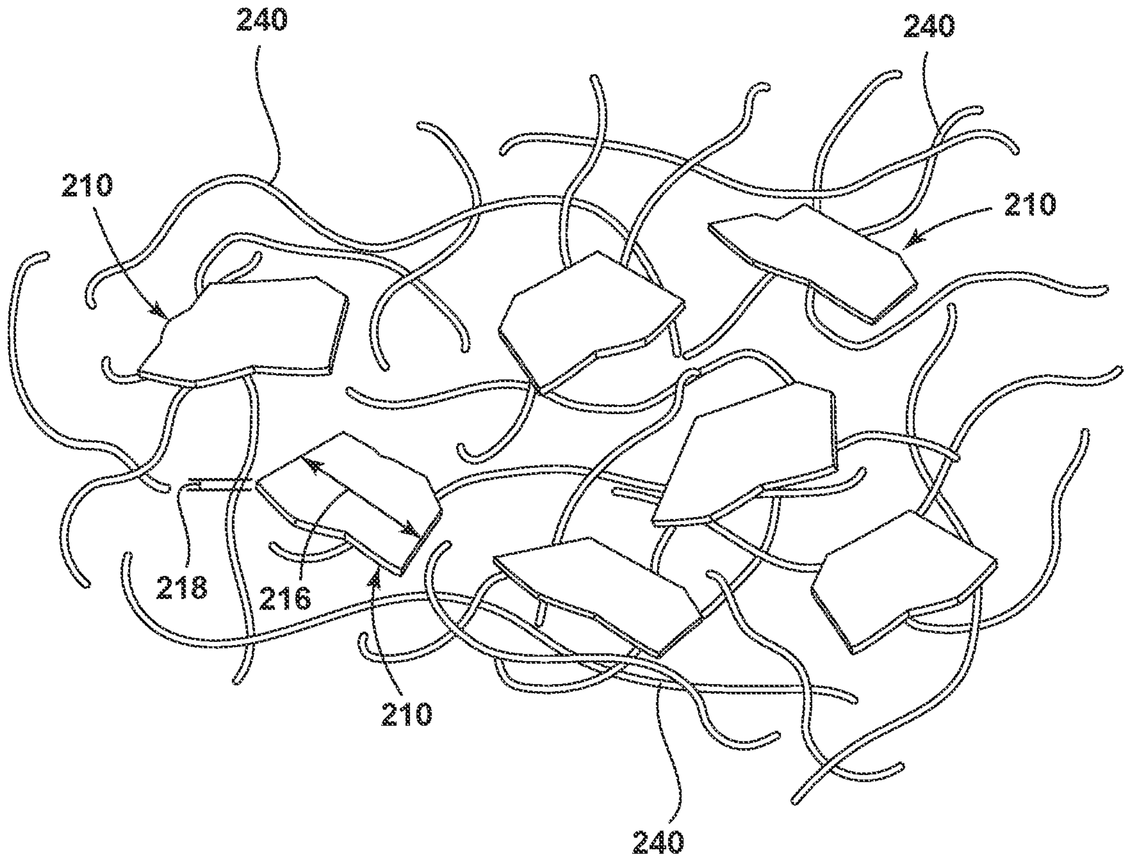
FIG. 10 is a schematic view of particles of a platy additive disposed in a polymer network of an adhesive, according to the present disclosure.
Figure 11:
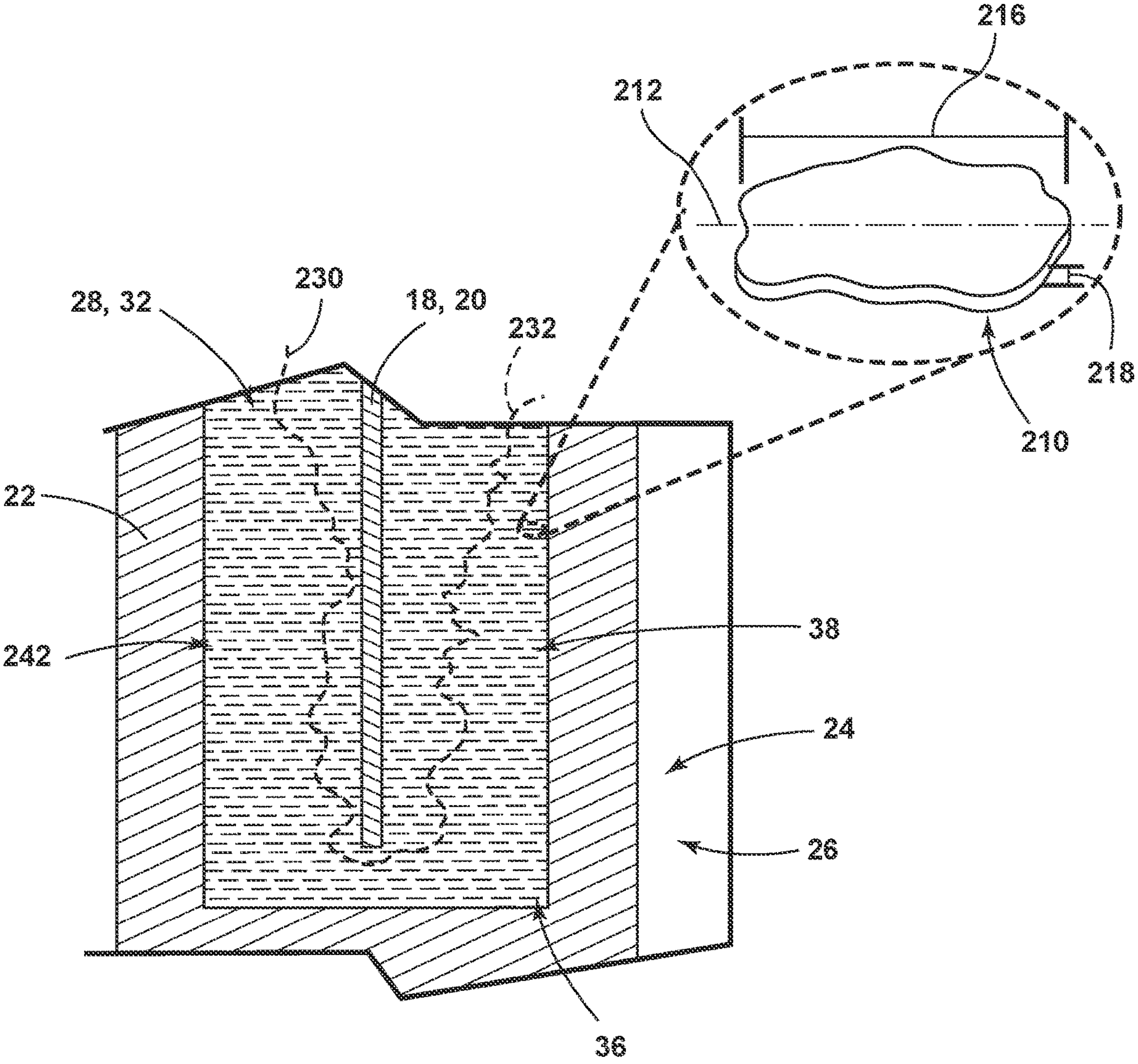
FIG. 11 is a partial cross-sectional view of a trim breaker assembly of an appliance cabinet with a groove having an adhesive with a platy additive disposed therein, and elevational view of a flake of the platy additive, according to the present disclosure.

Referring still to FIGS. 8A and 8B, and now FIGS. 10 and 11, the adhesive nozzle 200 generally dispenses a mixture of the platy additive 38 and the adhesive 36. The mixture of the adhesive 36 and the platy additive 38 may be a homogenous mixture when dispensed by the nozzle 200. The platy additive 38 may be mixed with the adhesive 36 before the dispensing process or during the dispensing process. For example, the adhesive nozzle 200 may include or be coupled to a mixing reservoir or a mixing tank configured to mix the adhesive 36 and the platy additive 38. As the adhesive 36 leaves the mixing reservoir, the platy additive 38 may be distributed throughout the adhesive 36. In some implementations, the adhesive nozzle 200 may be configured to mix a continuous feed, a semi-continuous feed, or a batch of the adhesive nozzle 200 and the platy additive 38 before or while dispensing the adhesive 36. The platy additive 38 may be mixed with the adhesive 36 in the adhesive nozzle 200. In various implementations, the adhesive 36 and the platy additive 38 may be mixed before being fed to the adhesive nozzle 200 to be dispensed. However, it is also contemplated that the platy additive 38 may be added to the adhesive 36 once already dispensed in the grooves 28, 32.

The amount of platy additive 38 that is included in the adhesive 36 may be between about 1 percent and about 40 percent, by volume, of the total mixture of the adhesive 36 and platy additive 38. The amount of platy additive 38 that is included by volume in the adhesive 36 may also be between about 1 percent and about 20 percent, between about 1 percent and about 10 percent, between about 1 percent and about 5 percent, between about 5 percent and about 30 percent, and between about 10 percent and about 40 percent. The specific percentage may be selected to balance fluid shear of the uncured adhesive 36 and stiffness of the cured adhesive with the reduction in gas permeation through the adhesive 36. For example, the adhesive 36 may have a high viscosity and the percent, by volume, of the platy additive 36 may be selected to promote fluid shear for dispensing the mixture of the adhesive 36 with the platy additive 36. In additional non-limiting examples, the percent, by volume, of the platy additive may be used to tailor or adjust the stiffness of the adhesive 36 to add stiffness for support and reduce adverse effects of the adhesive 36 becoming too stiff.

The platy additive 38 generally consists of a plurality of flakes or flake-like particles 210. Such flake-like particles 210 can include, but are not limited to, mica, glass, kaolin clay, other ceramic materials, combinations thereof, and other similar materials that can be made into fine flake-like particles or nanoflakes. In various implementations, the flakes 210 may generally have an approximately consistent size included in a mixture of the platy additive 38 and the adhesive 36. It is also contemplated that the flakes 210 may be a range of sizes that can be included in the mixture of the platy additive 38 and adhesive 36. The platy additive 38 may be at least one of glass flakes, mica flakes, kaolin clay flakes, other ceramic material flakes, or other fine flake-like particles. It is also contemplated that the platy additive 38 may be at least two of glass flakes, mica flakes, kaolin clay flakes, other ceramic material flake, or other fine flake-like particles.

Referring still to FIGS. 10 and 11, each flake 210 of the platy additive 38 includes a longitudinal extent 212 that extends substantially parallel with an elongated surface 214 of the respective flake 210. The flakes 210 may generally have a length 216 extending along the longitudinal extent 212 ranging from about 5 microns to about 800 microns and a thickness 218 of between about 30 nanometers (nm) and about 150 nm. The flakes 210 may also have the length 216 between about 1 micron and about 500 microns, between about 100 microns and about 800 microns, between about 100 microns and about 500 microns, and between about 500 and about 800 microns. The flakes 210 may also have the thickness 218 between about 10 nm and about 200 nm, between about 30 nm and about 150 nm, between about 50 nm and about 100 nm, and between about 80 nm and about 150 nm.

The flakes 210 generally have a high aspect ratio (length/thickness). The flakes 210 of the platy additive 38 may have an aspect ratio of between about 5, which may also be noted as 5:1, and about 5000 (i.e., 5000:1), between about 5 and about 100, between about 5 and about 300, between about 5 and about 500, between about 5 and about 1000, between about 5 and about 2500, between about 100 and about 5000, between about 100 and about 2500, between about 100 and 1000, and between about 100 and about 300. The flakes 210 of the platy additive 38 may have an aspect ratio of between about 100 and about 1000 when the platy additive 38 is glass. The flakes 210 of the platy additive 38 may have an aspect ratio of between about 100 and about 1000 when the platy additive 38 is mica.

The inclusion of the platy additive 38 assists in reducing or preventing gas permeation through the adhesive 36 in the cured state when disposed in the grooves 28, 32 of the trim breaker assembly 22. If gas permeates through the adhesive 36, the at least partial vacuum 26 within the insulation cavity 24 can degrade, which may adversely affect the insulation properties of the cabinet 12. One way that platy additive 38 reduces gas permeation is by increasing the distance of a path 230 that the gas 232 or other vapor may need to travel through the adhesive 36 to infiltrate or permeate into the insulation cavity 24. By increasing the distance of this path 230 that the gas 232 travels through the cured adhesive 36 to reach the insulation cavity 24, the potential degradation of the at least partial vacuum 26 through the adhesive 36 may be reduced, minimized, or prevented and thus reducing, minimizing, or preventing the adverse effect to the insulation properties of the cabinet 12.

The platy additive 38 is generally suspended by a plurality of polymer chains forming a polymer network 240 of the cured adhesive 36. The polymer network 240 supports or suspends the flakes 210 throughout the adhesive 36 and forms the path 230, while blocking or hindering other paths through the polymer network 240, reducing avenues for gas to permeate through the adhesive 36. The increased distance in the resulting or remaining paths 230 is due to the platy additive 38 blocking or hindering the other paths, which include the short or shorter paths through the polymer network 240 to the insulation cavity 24. The platy additive 38 also blocks or hinders multiple paths through the polymer network 240, which limits or reduces the number of paths through the polymer network 240. The increased distance in the paths 230 and the reduced number of paths 230 through the polymer network 240 assists in preventing or reducing gas permeation through the adhesive 36.

In some implementations, the flakes 210 may be randomly oriented relative to each other within the polymer network 240. In other implementations, the flakes 210 may be arranged or aligned within the polymer network 240. Typically, the elongated surface 214 is aligned in this fashion. The flakes 210 may be aligned in a direction of flow of the injection by the adhesive nozzle 200. The flakes 210 may also be aligned by vibrating or agitating the trim breaker assembly 22, which may cause the flakes 210 to align in a direction of the vibration and/or cause heavier portions of the flakes 210 to settle due to gravity. The aligned flakes 210 create an overlapping structure 242 that increases the length of the path 230. The overlapping structure 242 of the flakes 210 may be substantially parallel with the wrapper 18 and/or the liner assembly 20 when disposed in the respective grooves 28, 32. The overlapping structure 242 of the flakes 210 may be substantially perpendicular to the wrapper 18 and/or the liner assembly 20 when disposed in the respective grooves 28, 32.

Figure 12:
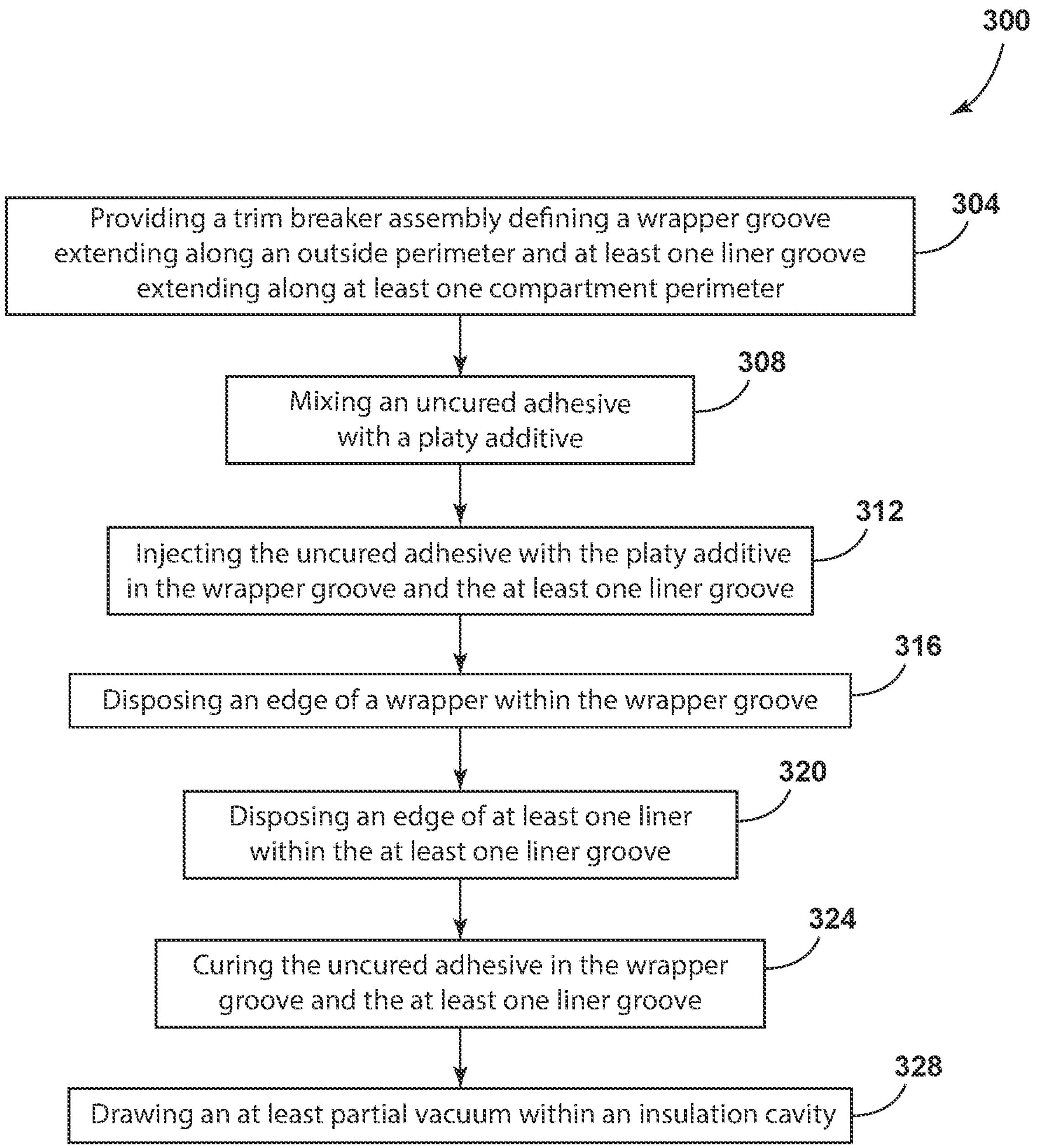
FIG. 12 is a flow diagram of a method of manufacturing a vacuum insulated structure, according to the present disclosure.

Referring to FIG. 12, with further reference to FIGS. 1-11, a flow diagram of a method 300 for manufacturing the vacuum insulated structure 10 is illustrated. The method 300 includes step 304 of providing a trim breaker assembly 22 that defines the outer perimeter 136 and at least one compartment perimeter 144, 146. The trim breaker assembly 22 defines the wrapper groove 28 extending along the outer perimeter 136 and the at least one liner groove 32 extending along at least one compartment perimeter 144, 146. The at least one liner groove 32 may include the refrigerator liner groove 32*a* and/or the freezer liner groove 32*b*.

At step 308, the adhesive 36 in the uncured state (i.e., an uncured adhesive) may be mixed with at least one platy additive 38. The platy additive 38 may be mixed with the uncured adhesive 36 in the mixing reservoir coupled to the adhesive nozzle 200. The uncured adhesive 36 and the platy additive 38 may be mixed until the platy additive 30 is homogeneously distributed throughout the adhesive 36. The uncured adhesive 36 may be mixed with a first platy additive 38 and a second platy additive 38. In step 312, the uncured adhesive 36 is injected into the wrapper groove 28 and the liner groove 32, as shown in FIGS. 8A and 8B. The adhesive 36 may be injected into the refrigerator liner groove 32*a* and/or the freezer liner groove 32*b*. The adhesive 36 may be injected with the adhesive nozzle 200. Steps 308 and 316 may be performed concurrently using the adhesive nozzle 200 to mix the adhesive 36 and the platy additive 38 together.

In step 316, the edge 30 of the wrapper 18 may be positioned or disposed within the wrapper groove 28 with the uncured adhesive 36, as shown in FIGS. 9A and 9B. In step 320, the edge 34 of the liner assembly 20 may be positioned or disposed within the liner groove 32 with the uncured adhesive 36, as shown in FIGS. 9A and 9B. The liner assembly 20 may include the refrigerator liner 20*a* and the freezer liner 20*b*. The edge 34*a* of the refrigerator liner 20*a* may be disposed in the refrigerator liner groove 32*a* with the uncured adhesive 36 and the edge 34*b* of the freezer liner 20*b* may be disposed in the freezer liner groove 32*b* with the uncured adhesive 36. In steps 320 and 324, the edge 30 of the wrapper 18 and/or the edge 34 of the liner assembly 20 may be disposed within the respective grooves 28, 32 without the uncured adhesive 36 and the adhesive 36 may be inserted into the grooves 28, 32 around the wrapper 18 and liner assembly 20, respectively.

In step 324, the uncured adhesive 36 disposed in the wrapper groove 28 and the at least one liner groove 32 is cured to form the polymer network 240 that suspends the platy additive 38 to reduce the gas 232 permeation through the adhesive 36. The uncured adhesive 36 may be cured by heating the uncured adhesive 36. The uncured adhesive 36 may also be cured by activating a photoinitiator included in the adhesive 36 by providing a light source that interacts with the photoinitiator. In step 328, the at least partial vacuum 26 may be or is drawn in the insulation cavity 24 defined by the wrapper 18 and the liner assembly 20 coupled together with the trim breaker assembly 22. Step 328 may also include coupling the doors 50 to the cabinet 12, adding the refrigeration system, and otherwise completing assembly of the appliance 10. The steps of the method 300 may be performed in any order, simultaneously, concurrently, repeated, omitted, etc. without departing from the teachings herein.

Use of the present device may provide a variety of advantages. For example, the platy additive 38 mixed with the adhesive 36 and disposed in the grooves 28, 32 assists in reducing or preventing gas infiltration through the adhesive 36. By preventing or reducing gas infiltration through the adhesive 36, the at least partial vacuum 26 drawn in the insulation cavity 24 will be maintained or better maintained for a greater length of time. By maintaining the at least partial vacuum 26 for a longer period of time, the appliance 10 may have a longer operational life before the insulating properties of the appliance 10 are reduced or lost. Further, by reducing or preventing gas infiltration through the adhesive 36, infiltration of water vapor through the adhesive 36 will be reduced. The reduction of water vapor in the insulation cavity 24 may increase the longevity of the insulation materials 60 therein. By increasing the longevity of the insulation materials 60, the longevity of the insulation properties of the cabinet 12 may also be increased. Furthermore, the platy additive 38 may provide some rigidity in the adhesive 36 and thus a greater rigidity in the trim breaker assembly 22 and the cabinet 12. Moreover, due to the increase in rigidity of the adhesive 36, a greater vacuum 26 may be drawn in the insulation cavity 24. The greater vacuum 26 in the insulation cavity 24 may increase the insulation properties of the cabinet 12 by reducing heat transfer paths (i.e., gas within the insulation cavity 24). Additional benefits or advantages may be realized and/or achieved.

The device disclosed herein is further summarized in the following paragraphs and is further characterized by combinations of any and all of the various aspects described herein.

According to an aspect of the present disclosure, a vacuum insulated appliance includes a cabinet defining at least one compartment. The cabinet includes a wrapper and a liner assembly. The wrapper and the liner assembly define an insulation cavity therebetween. The insulation cavity is under an at least partial vacuum. A trim breaker assembly is coupled to the wrapper and the liner assembly. The trim breaker assembly defines a wrapper groove to receive an edge of the wrapper and at least one liner groove to receive at least one edge of the liner assembly. An adhesive is disposed in the wrapper groove and the at least one liner groove, with the adhesive sealing the insulation cavity. The adhesive includes a platy additive to reduce gas permeation therethrough to maintain the at least partial vacuum in the insulation cavity.

According to another aspect, a platy additive is at least one of glass flakes, mica flakes, and kaolin clay flakes.

According to yet another aspect, an aspect ratio between a length and a thickness of each particle of a platy additive is between 5 and 500.

According to another aspect, at least one compartment includes a first compartment and a second compartment, where a liner assembly includes a first liner defining the first compartment and a second liner defining the second compartment.

According to yet another aspect, at least one liner groove includes a first liner groove and a second liner groove. A trim breaker assembly defines an outer perimeter and an inner perimeter and includes a cross member. A wrapper groove extends along the outer perimeter of the trim breaker assembly. The first liner groove extends along a first portion of the inner perimeter and across the cross member to align with a perimeter of a first compartment. The second liner groove extends along a second portion of the inner perimeter and across the cross member to align with a perimeter of a second compartment.

According to another aspect, a trim breaker assembly defines an outer perimeter and an inner perimeter. A wrapper groove extends along the outer perimeter of the trim breaker assembly and an at least one liner groove extends along at least a portion of the inner perimeter of the trim breaker assembly.

According to yet another aspect, a platy additive is homogeneously distributed in an adhesive.

According to another aspect, an adhesive is an epoxy.

According to another aspect of the present disclosure, a refrigeration appliance includes a trim breaker assembly defining an outside wrapper groove and a refrigerator liner groove. An adhesive is disposed in the outside wrapper groove and the refrigerator liner groove, where the adhesive includes a platy additive to reduce air infiltration through the adhesive. An outside wrapper has an edge disposed within the outside wrapper groove of the trim breaker assembly with the adhesive. A refrigerator liner has an edge disposed within the refrigerator liner groove of the trim breaker assembly with the adhesive. The refrigerator liner defines a refrigerator compartment.

According to another aspect, an outside wrapper and a refrigerator liner define an insulation cavity therebetween, where an at least partial vacuum is defined in the insulation cavity.

According to yet another aspect, a platy additive is at least one of glass flake, mica flakes, and kaolin clay flakes.

According to another aspect, an adhesive includes a polymer network suspending a platy additive therein to reduce gas permeation through the polymer network.

According to yet another aspect, a freezer liner has an edge disposed within a freezer liner groove defined by a trim breaker assembly. The freezer liner defines the freezer compartment.

According to yet another aspect of the present disclosure, a method for manufacturing a vacuum insulated cabinet includes providing a trim breaker assembly defining a wrapper groove extending along an outer perimeter and at least one liner groove extending along at least one compartment perimeter, mixing an uncured adhesive with a platy additive, and injecting the uncured adhesive with the platy additive in the wrapper groove and the at least one liner groove. The method further includes positioning an edge of a wrapper within the wrapper groove with the uncured adhesive, positioning an edge of at least one liner within the at least one liner groove with the uncured adhesive, and curing the uncured adhesive in the wrapper groove and the at least one liner groove to form a polymer network that suspends the platy additive to reduce a gas permeation therethrough.

According to yet another aspect, a method includes a step of mixing an uncured adhesive with a platy additive that is performed concurrently with a step of injecting the uncured adhesive with the platy additive by using an adhesive nozzle that is coupled to a mixing reservoir.

According to another aspect, a method includes a step of mixing an uncured adhesive with a platy additive that includes mixing the uncured adhesive with the platy additive until the platy additive is homogeneously distributed with the uncured adhesive.

According to yet another aspect, a method includes a step of mixing an uncured adhesive with the platy additive forms a mixture where a platy additive is between 1 percent and 40 percent by volume of the mixture of an uncured adhesive and the platy additive.

According to another aspect, a method includes drawing an at least partial vacuum within an insulation cavity defined between a wrapper and at least one liner.

According to yet another aspect, at least one liner groove includes a refrigerator liner groove and a freezer liner groove. A method includes a step of injecting an uncured adhesive with a platy additive includes injecting the uncured adhesive with the platy additive in the refrigerator liner groove and injecting the uncured adhesive with the platy additive in the freezer liner groove.

According to another aspect, at least one liner includes a refrigerator liner and a freezer liner. A method includes a step of positioning an edge of at least one liner within at least one liner groove includes positioning an edge of the refrigerator liner within a refrigerator liner groove and positioning an edge of the freezer liner within a freezer liner groove.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vacuum insulated appliance, comprising:
- a cabinet defining at least one compartment, the cabinet including:
  - a wrapper;
  - a liner assembly, wherein the wrapper and the liner assembly define an insulation cavity therebetween, and wherein an at least partial vacuum is defined in the insulation cavity; and
  - a trim breaker assembly coupled to the wrapper and the liner assembly, wherein the trim breaker assembly defines a wrapper groove to receive an edge of the wrapper and at least one liner groove to receive at least one edge of the liner assembly, and wherein the at least one liner groove is offset from the wrapper groove; and
  - an adhesive disposed in the wrapper groove and the at least one liner groove, the adhesive sealing the insulation cavity, wherein the adhesive includes a platy additive to reduce gas permeation therethrough to maintain the at least partial vacuum in the insulation cavity, the platy additive being suspended in the adhesive by a plurality of polymer chains.

2. The vacuum insulated appliance of claim 1, wherein the platy additive is at least one of glass flakes, mica flakes, and kaolin clay flakes.

3. The vacuum insulated appliance of claim 1, wherein an aspect ratio between a length and a thickness of each particle of the platy additive is between 5 and 500.

4. The vacuum insulated appliance of claim 1, wherein the at least one compartment includes a first compartment and a second compartment, and wherein the liner assembly includes a first liner defining the first compartment, and a second liner defining the second compartment.

5. The vacuum insulated appliance of claim 4, wherein the at least one liner groove includes a first liner groove and a second liner groove, and wherein the trim breaker assembly defines an outer perimeter and an inner perimeter and includes a cross member, and further wherein the wrapper groove extends along the outer perimeter of the trim breaker assembly, the first liner groove extends along a first portion of the inner perimeter and across the cross member to align with a perimeter of the first compartment, and the second liner groove extends along a second portion of the inner perimeter and across the cross member to align with a perimeter of the second compartment.

6. The vacuum insulated appliance of claim 4, wherein the trim breaker assembly defines an outer perimeter and an inner perimeter, and wherein the wrapper groove extends along the outer perimeter of the trim breaker assembly and the at least one liner groove extends along at least a portion of the inner perimeter of the trim breaker assembly.

7. The vacuum insulated appliance of claim 1, wherein the platy additive is homogeneously distributed in the adhesive.

8. The vacuum insulated appliance of claim 1, wherein the adhesive is an epoxy.

9. A refrigeration appliance, comprising:
- a trim breaker assembly defining an outside wrapper groove and a refrigerator liner groove, wherein the refrigerator liner groove is recessed relative to the outside wrapper groove;
- an adhesive disposed in the outside wrapper groove and the refrigerator liner groove, wherein the adhesive includes a platy additive to reduce air infiltration through the adhesive, wherein a plurality of polymer chains supports the platy additive within the adhesive;
- an outside wrapper having an edge disposed within the outside wrapper groove of the trim breaker assembly with the adhesive; and
- a refrigerator liner having an edge disposed within the refrigerator liner groove of the trim breaker assembly with the adhesive, wherein the refrigerator liner defines a refrigerator compartment.

10. The refrigeration appliance of claim 9, wherein the outside wrapper and the refrigerator liner define an insulation cavity therebetween, and wherein an at least partial vacuum is defined in the insulation cavity.

11. The refrigeration appliance of claim 9, wherein the platy additive is at least one of glass flakes, mica flakes, and kaolin clay flakes.

12. The refrigeration appliance of claim 9, wherein the adhesive includes the plurality of polymer chains forming a polymer network and an amount of platy additive between about 1 percent and about 40 percent, by volume, of a total mixture of the adhesive and the platy additive.

13. The refrigeration appliance of claim 9, further comprising:
- a freezer liner having an edge disposed within a freezer liner groove defined by the trim breaker assembly, wherein the freezer liner defines a freezer compartment.

14. A vacuum-insulated appliance, comprising:
- a trim breaker assembly defining a wrapper groove and a liner groove;
- an adhesive disposed in the wrapper groove and the liner groove, wherein the adhesive includes a platy additive to reduce air infiltration through the adhesive, wherein a plurality of polymer chains supports the platy additive within the adhesive, and wherein the platy additive is added at a percent by volume to promote fluid shear for dispensing the adhesive;
- a wrapper having an edge disposed within the wrapper groove of the trim breaker assembly with the adhesive; and
- a liner having an edge disposed within the liner groove of the trim breaker assembly with the adhesive, wherein the liner defines at least one compartment, wherein the liner groove is offset from the wrapper groove.

15. The vacuum-insulated appliance of claim 14, wherein the adhesive includes an amount of platy additive between about 1 percent and about 40 percent, by volume, of a total mixture of the adhesive and the platy additive.

16. The vacuum-insulated appliance of claim 14, wherein the platy additive includes a plurality of flakes and the plurality of flakes are oriented perpendicular to the wrapper when the wrapper is disposed in the wrapper groove and are oriented substantially perpendicular to the liner when disposed in the liner groove.

17. The vacuum insulated appliance of claim 1, wherein the platy additive includes a plurality of flakes and the plurality of flakes are randomly oriented relative to each other within the plurality of polymer chains.

18. The vacuum insulated appliance of claim 1, wherein the wrapper groove has a wrapper groove depth and the at least one liner groove has a liner groove depth and the wrapper groove depth and the liner groove depth are approximately equal.

19. The vacuum insulated appliance of claim 1, wherein an amount of adhesive disposed in the wrapper groove and an amount of adhesive disposed in the liner groove are approximately equal.

20. The refrigeration appliance of claim 9, wherein the platy additive includes a plurality of flakes and the plurality of flakes are randomly oriented relative to each other within the plurality of polymer chains.

* * * * *